Dec. 31, 1929.　　　O. KREMMLING　　　1,741,722
METHOD OF AND APPARATUS FOR MECHANICALLY TREATING OBJECTS
Filed Jan. 13, 1928　　　5 Sheets-Sheet 1
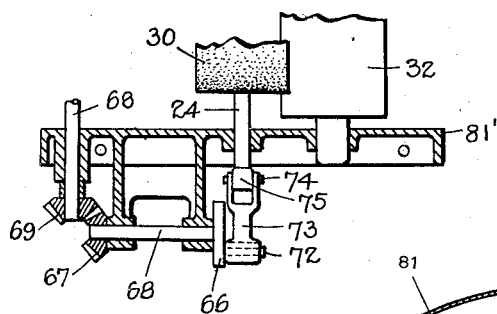
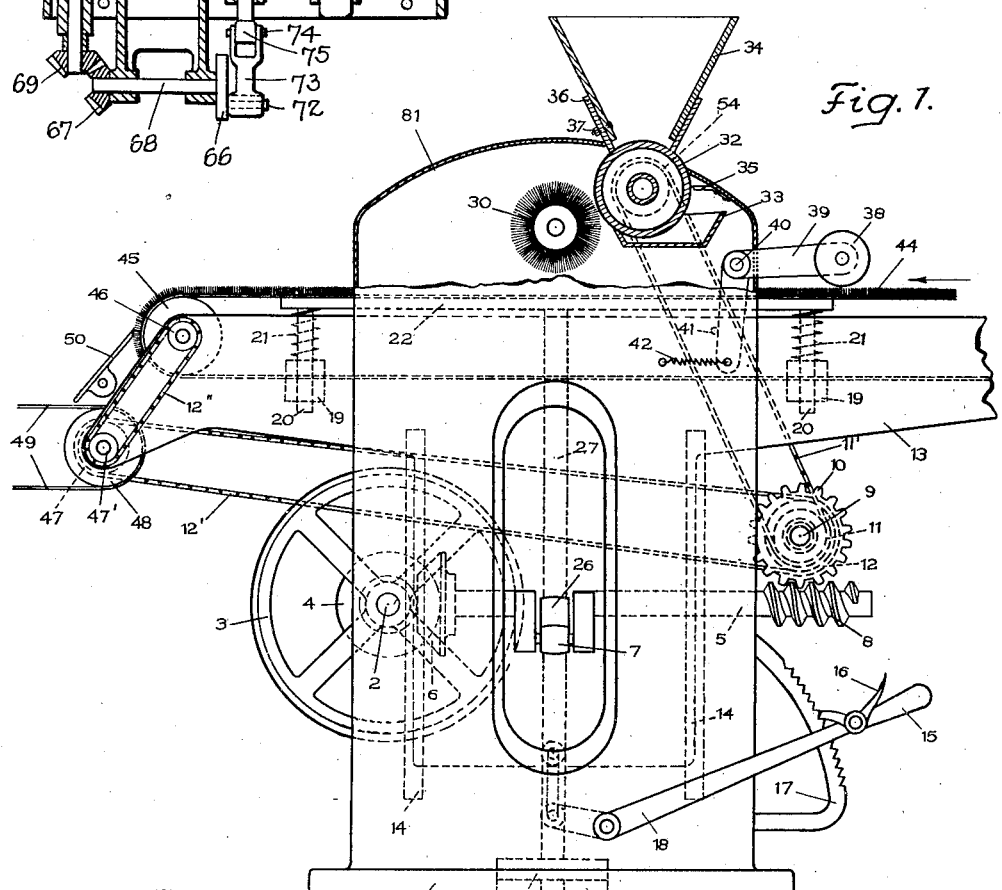
Inventor:
OTTO KREMMLING
By Conway P. Coe
ATTORNEY Dec. 31, 1929.  O. KREMMLING  1,741,722

METHOD OF AND APPARATUS FOR MECHANICALLY TREATING OBJECTS

Filed Jan. 13, 1928  5 Sheets-Sheet 2

Inventor:
OTTO KREMMLING
By: [signature]
ATTORNEY.

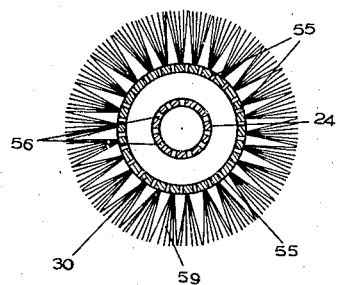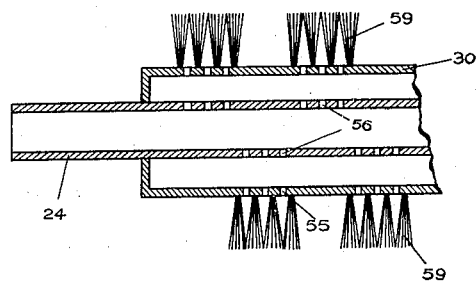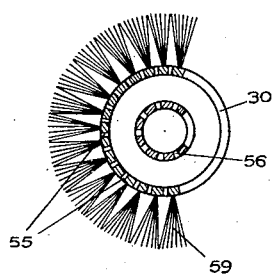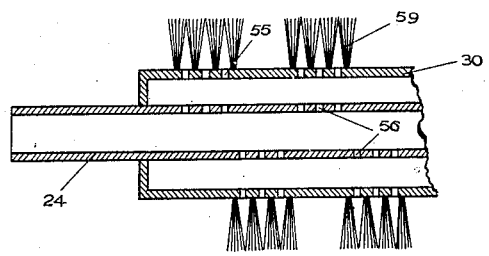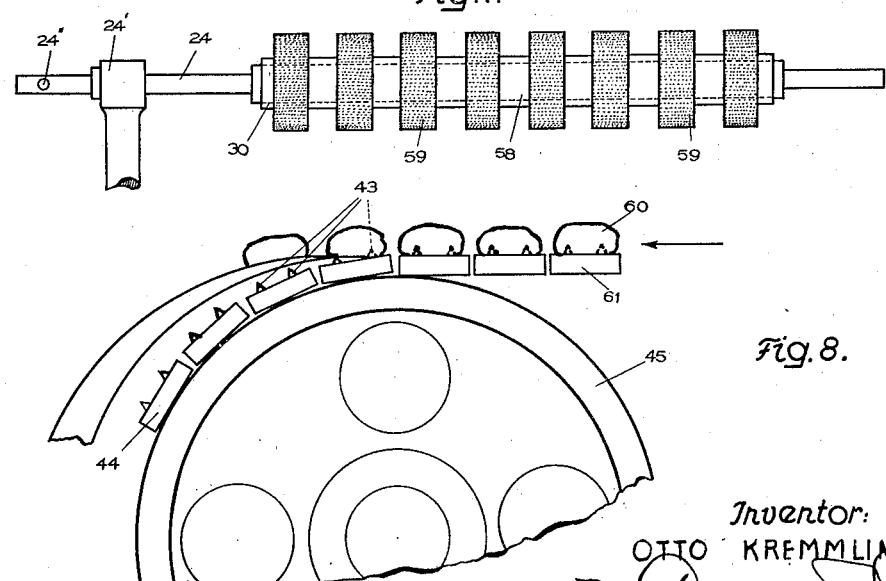

Dec. 31, 1929.   O. KREMMLING   1,741,722
METHOD OF AND APPARATUS FOR MECHANICALLY TREATING OBJECTS
Filed Jan. 13, 1928   5 Sheets-Sheet 4

Inventor:
OTTO KREMMLING
By: [signature] ATTORNEY

Dec. 31, 1929.   O. KREMMLING   1,741,722
METHOD OF AND APPARATUS FOR MECHANICALLY TREATING OBJECTS
Filed Jan. 13, 1928   5 Sheets-Sheet 5
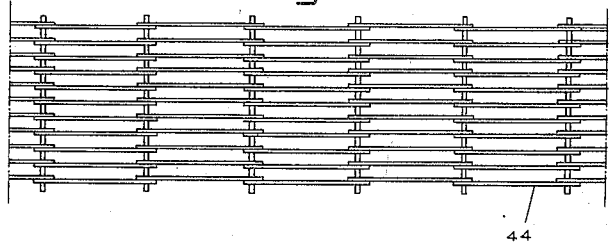
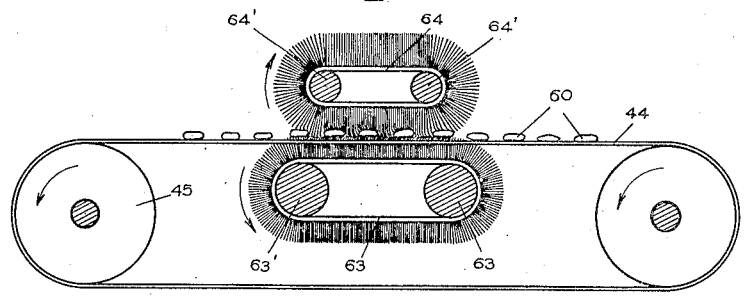
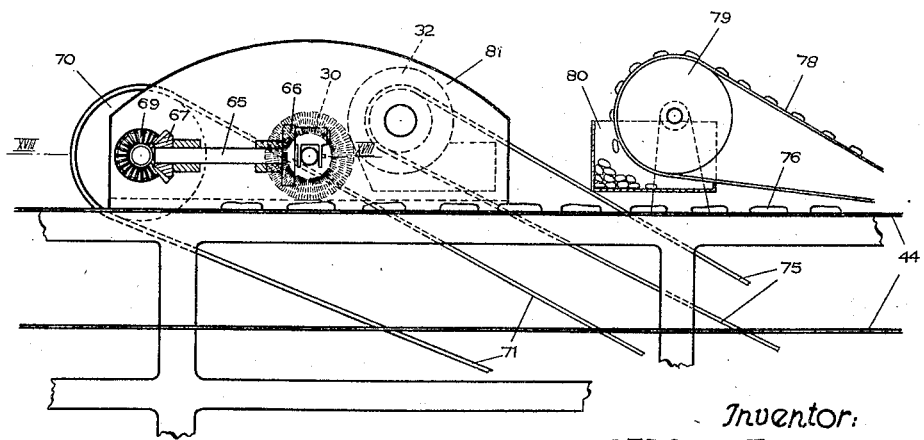
Inventor:
OTTO KREMMLING
By: [signature]
ATTORNEY Patented Dec. 31, 1929

1,741,722

UNITED STATES PATENT OFFICE

OTTO KREMMLING, OF HAMERSLEBEN, NEAR OSCHERSLEBEN, GERMANY

METHOD OF AND APPARATUS FOR MECHANICALLY TREATING OBJECTS

Application filed January 13, 1928, Serial No. 246,531, and in Germany December 10, 1925.

My invention relates to a method of, and apparatus for, mechanically treating objects, for instance, coating, icing or brushing cakes, sugar cores, etc.

It is an object of my invention to improve existing methods and apparatus for the purpose specified and to this end I provide a brush which may be cylindrical or constituted by an endless band resembling a conveyer, and I impart to said brush, or the goods, movement in a given direction and movement transversely thereto with respect to the goods, or to the brush, as the case may be.

It has already been proposed to provide separate rotary pencils for the purpose aforesaid but in machines of this type the treatment of the goods is poor and the output is very small, and the coating of cakes with such pencils involves difficulties which not only reduce the output but also interfere with the uniformity of coating.

It has also been proposed to provide rotary cylinders for coating but in this case the operation is performed in one direction only so that the coating is not applied as thoroughly as required. Moreover the edges of the goods are not coated uniformly, those edges extending transversely to the direction in which the bristles are moving, being preferred.

It has further been proposed to provide flat brushes which are reciprocating instead of being rotated, but firstly the supply of coating material to these brushes is extremely difficult and, secondly, the distribution is as poor as in the circular brushes, the transverse edges being unevenly coated.

Another drawback with which all the said old devices are encumbered is that the coating, and particularly molten sugar, soon becomes "dead" while being applied, that is, brittle and "sandy" and it is frequently necessary to stop the machine for cleaning.

My invention combines the advantageous features of rotary and reciprocating brushes without having any of the drawbacks of either.

The movement of the brushes serves not only for applying any substance to any goods, as coating, icing, etc., of cakes, but also for removing foreign matter from such goods, as flour from cakes. It is understood that I am not limited to any particular application of my process and my machine which may be utilized in various ways without departing from my invention, for instance, for greasing baking trays, for applying liquid or any other substance to dough before baking, in the manufacture of rubber and paper, for cleaning or waxing floors, etc., in short wherever objects are coated with a liquid or plastic substance, or cleaned, by means of brushes.

In a preferred embodiment of my invention I provide means for applying coating or other substance to the brush or brushes of the machine by means of a cylinder which is charged with coating substance from a hopper. Conversely, the said cylinder may also be used for removing from the brush dry or moist foreign matter which it has detached from the goods.

In the drawings, machines for performing my invention are illustrated diagrammatically by way of example.

In the drawings

Fig. 1 is an elevation, partly in section,

Fig. 3 is a longitudinal section of a brush, drawn to a larger scale,

Fig. 4 is a cross section of the brush,

Figs. 5 and 6 are similar sections showing a slightly modified type of brush,

Fig. 7 is an elevation of a complete brush,

Fig. 8 shows part of a conveyer feeding the goods to the brush or brushes,

Figure 13:
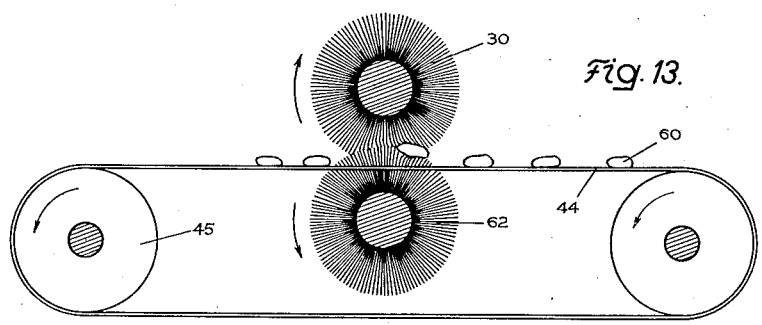
Figure 14:
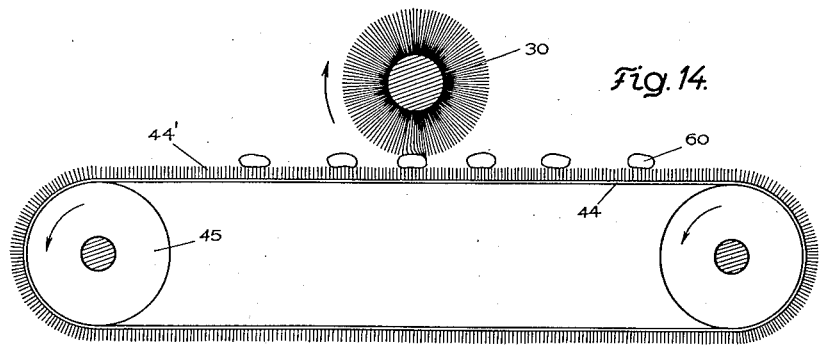

Fig. 13 is a diagrammatic elevation of a machine having a brush on either side of a conveyer, Fig. 14 is a diagrammatic elevation of a machine the conveyer of which is constructed as a brush, Fig. 15 is a plan view of the conveyer, Fig. 16 is a diagrammatic elevation of a machine similar to that in Fig 13 but having endless instead of cylindrical brushes, Fig. 17 is a machine in which the brush is combined with a dough-dividing mechanism, Fig. 18 is a part section on the line XVIII—XVIII of the machine, Fig. 19 is a sectional elevation of a machine having heating means for the coating substance.

Figure 2:
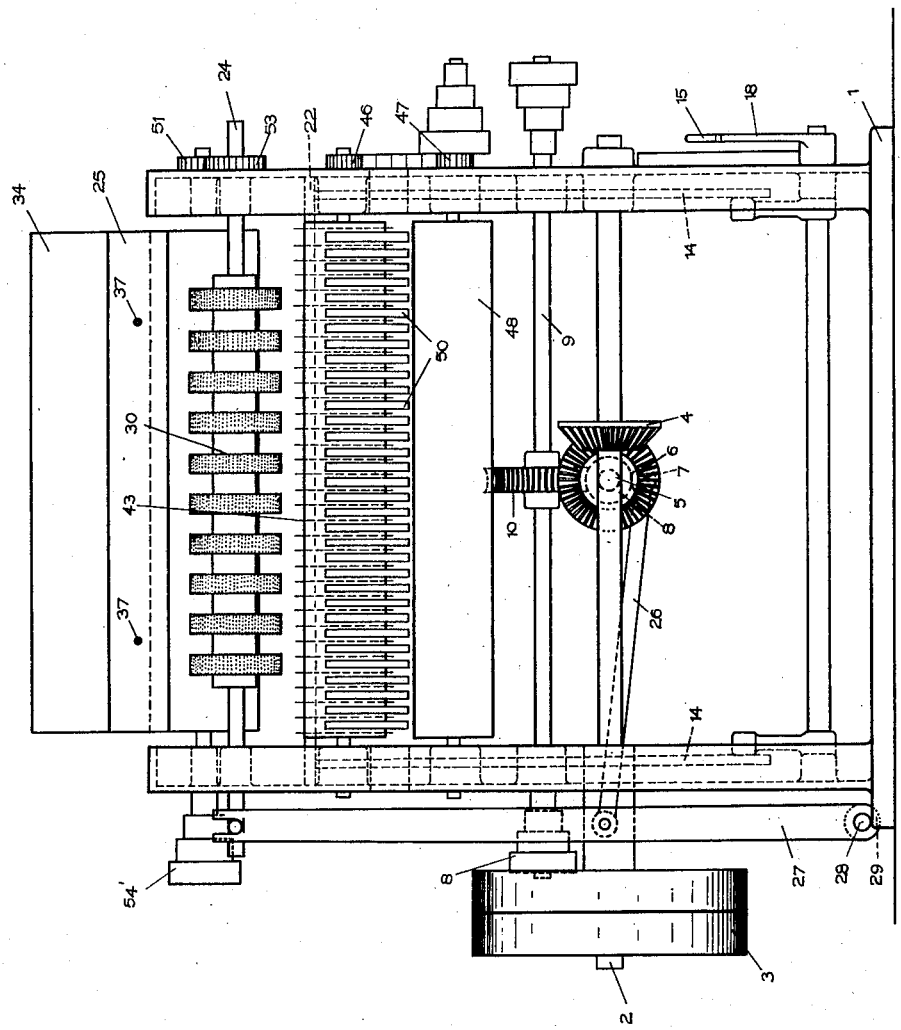
Fig. 2 is an end elevation of a complete machine having a cylindrical brush.

Referring now to Figs. 1 and 2, 1 is the frame of the machine, 2 is its main driving shaft, 3 is a pulley and 4 is a bevel gear on the driving shaft, and 5 is a transverse crank shaft to which rotation is imparted from the shaft 2 through the medium of a bevel gear 6, 7 is the crank of the shaft 5, 8 is a worm on one end of the shaft 5, 10 is a worm wheel on a lay shaft 9 which meshes with the worm 8, and 11, 12 are sprockets on the lay shaft 9.

13 is a table having vertical guide bars 14, 15 is a handle, 16 is a spring clip on said handle, 17 is a sector notched for the clip, and 18 is a double-armed lever connected with the handle 15 and the table, 22 is a plate arranged above the table 13, 19 are perforated brackets on the table, 20 are pins projecting downwardly from the plate, and 21 are springs surrounding the pins. This resilient arrangement of the table plate 22 is preferable as the reciprocating and rotating brush 30 exerts vertical forces on the goods which are much in excess of those exerted by a brush that is only rotary.

26 is a connecting rod and 27 is a rocking lever fulcrumed on a pin 28 in bearings 29 of the frame to which rocking lever the connecting rod is pivoted. The forked end of the rocking lever engages a pin on the shaft 24 of the brush 30 which is adapted to reciprocate in its bearings.

32 is a supply cylinder carried to rotate in the frame 1, 33 is a supply hopper which may be provided with a heating jacket, for liquid coating arranged below the cylinder 32, and 34 is a hopper for frothy substances into which the cylinder 32 projects from below, and 35 is a scraper for regulating the quantity of substance adhering to the cylinder 32. The frothy substance is directly delivered to the brush 30 by the cylinder 32 which constitutes the bottom of the hopper 34. 36 is a scraper at the hopper 34 for regulating the quantity of frothy substance adhering to the cylinder 32, and 37 are screws for holding the scraper to the hopper.

39 are a pair of angular levers fulcrumed in the frame 1 at 40, 38 is a hold-down roller at one end of the levers, 42 are springs and 41 are checks to which the springs tend to hold the levers 39. The hold-down rollers serve for pinning the goods 60 on points 43 of the conveyer links 61, Fig. 8, to prevent lateral displacement of the goods under the action of the brush 30. This is important on account of the heavy side thrust exerted on the goods by the reciprocating brush.

44 is the conveyer which is actuated by a roller 45 to which rotation is imparted from the sprocket 12 through a chain 12'. The chain 12' is carried on a sprocket 47 which is held in an extension of the table 13, 12'' is a chain on a sprocket 47' on the shaft on which the sprocket 47 is keyed, and 46 is a sprocket on the shaft of the roller 45, the chain 12'' being carried on the sprockets 47' and 46. 48 is a roller also seated on the shaft of the sprocket 47, and 49 is an auxiliary conveyer carried on the roller 48 which is without the points 43 of the conveyer 44. From the conveyer 44, the goods are detached by an inclined grid 50 the bars of which engage between the points 43, and slide down the grid until they are delivered in regular succession to the auxiliary conveyer 49. This is a particularly suitable appliance for detaching the goods from the points 43.

The brush 30 and the supply cylinder 32 are connected by gears 51 and 53 on their respective shafts, and rotation is imparted to a sprocket 54 on the shaft of the cylinder 32 by a chain 11' on the sprocket 11 on the lay shaft 9.

As will appear from Fig. 4 the cylindrical brush 30 is preferably made hollow and equipped with a hollow shaft 24 which is perforated at 56, and perforations 55 are formed in the roller 30, preferably intermediate the bristles 59. Steam or any other fluid is admitted to the hollow shaft 24 through suitable piping, not shown, which when escaping at the perforations 55, moistens the brush bristles 59.

The arrangement illustrated in Figs. 5 and 6 is similar to that illustrated in Figs. 3 and 4, but in this brush the bristles 59 extend only over half the perimeter of the brush, as shown in Fig. 5, and the bristles are staggered, as shown in Fig. 6, or arranged in a helical line to obtain a more uniform action.

When the coating substance is applied at very high temperature, a cowl 81 is provided to cover the coating appliance, and means may be provided for supplying heating fluid, as steam, to the cowl to maintain the substance in proper condition. Such means will be described with reference to Fig. 19.

A complete brush cylinder 30 is shown in Fig. 7. The brush is provided with a plurality of bristle units and the bristles in this case are not staggered so that a series of parallel rings is formed. The several rings are separated by tubular stays 58 which are about as wide as the bristle units. This subdivision of the bristles involves the advantage that the uniformity of the work of the brush is increased and the edges of the goods are properly treated. 24' is one of the bearings in which the shaft 24 is adapted to reciprocate, and 24'' is the pin by which the rocking lever 27 engages the shaft 24.

With a brush broken up into several bristle units, the supply cylinder 32 is arranged non-reciprocating, that is, does not partake in the reciprocation of the brush 30 but notwithstanding the brush 30 is supplied uniformly.

In order to facilitate the detaching of the goods 60 from the conveyer 44, the points of the conveyer links 61 are tapered as shown in Fig. 8, the inclined faces of the points 43 being arranged in the direction in which the conveyer is moving.

The operation of the machine is as follows:

The goods 60, of any size, are arranged on the conveyer in any desired arrangement and motion is imparted to the conveyer by the means described in the direction of the arrows in Figs. 1 and 8. The holding-down roller 38 forces the goods onto the points 43 so that they can resist the thrust of the bristles without being displaced. The goods are now presented to the brush 30, uniformly coated by the combined rotary and transverse motion of the brush, detached by the grid 50, and delivered to the auxiliary conveyer 49. Preferably the auxiliary conveyer moves through a drier, not shown, in which the goods are dried so as to be ready for shipping when they leave the drier.

The extent to which the edges of the goods are coated is regulated by raising and lowering the table 13 with the plate 22 by the hand lever 15. The adjustability of the table is also desirable because the bristles of the brushes can, by suitable adjustment of the table, be bent uniformly for goods of varying thickness. Small variations in the thickness are automatically made up for by the springs 21 of the plate 22.

In order to vary the speed of the brush 30, I may provide a belt drive and stepped pulleys instead of the chain drive. The machine illustrated in Figs. 1 and 2 is equipped with both facilities, 8' being a stepped pulley on the shaft 9 which is connected with a corresponding pulley 54' on the shaft 24 of the brush 30. The means for reciprocating the brush are the same for both drives as the belt drive will not interfere with the movements of the shaft 24.

Figure 9:
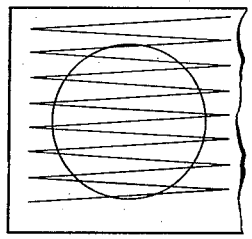
Figs. 9 to 12 illustrate various stages of operation of the machine.
Figure 11:
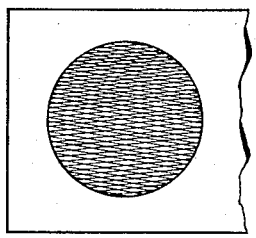

Figs. 9 and 11 show the result of a drive by which the brush is reciprocated at a more rapid rate than it is rotated. The line in Fig. 9 shows the path of a single bristle and it will appear that it describes a zig-zag line of small pitch. When more than one bristle are applied as assumed in Fig. 11 a net of lines intersecting at short distances is formed.

Figure 10:
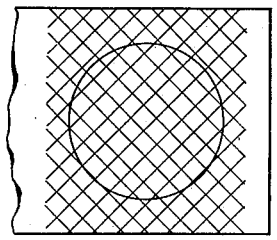
Figure 12:
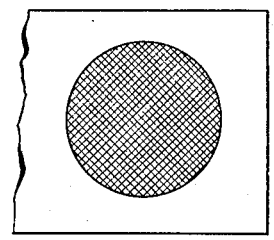

With the rate of reciprocation equal to the rate of rotation a system of lines intersecting at an angle of 90 degs., and inclined to the axis of the brush 30 at 45 degs., is formed as shown in Fig. 10, and the finished goods will appear as shown in Fig. 12.

With the machine described, each section of the area of the goods is repeatedly coated or otherwise treated, according to the relative rate of rotation and reciprocation, being as often engaged with freshly supplied bristles of the brush, and in this manner a thoroughly uniform and dense coating is obtained, not only on comparatively flat goods but also on goods of more irregular form, as cracknels, rings, etc., and with hot or cold liquid coating and/or frothy substance. Hot sugar icing is also readily applied as the several area elements of the goods are in frequent contact with the brushes so that the substance is applied regularly and does not become "dead". Even very irregular surfaces as so-called pavement (an imitation of stone paving on gingerbread) are coated with an absolutely uniform layer.

Instead of reciprocating the brush 30 the conveyer 44 may be reciprocated in addition to its feeding movement, or rotary movement may be imparted to it with respect to the brush which in this case is only rotating.

As mentioned, I am not limited to any particular field of usefulness of the method and the machine, as it may be used in various ways without departing from my invention.

By way of example, a machine particularly suitable for cleaning goods is shown in Fig. 13. In this instance, the brush 30 cooperates with a brush 62 below the conveyer 44 the bristles of this lower brush projecting through the bars of the conveyer. The goods 60, as cakes, delicate sugar goods, liquor beans, etc., are lifted from the conveyer 44 by the lower brush 62 so that they are merely acted on by the bristles of the two brushes on all sides, and foreign matter, flour etc., is removed. Round or spherical objects are rotated and flat ones, tablets etc., are reciprocated while being acted on by the brushes 30, 62. Preferably the bristles of the lower brush 62 are made comparatively stiff to facilitate its penetration through the conveyer 44.

The important improvement achieved by the duplication of the brush is that damage to the goods is an impossibility as they are lifted clear of the conveyer 44 while being treated.

As shown in Fig. 14, the conveyer 44 is equipped with bristles 44' which act in a similar manner as the lower brush 62.

If desired, a blower, not shown, may be provided for removing flour and other foreign matter which the brush or brushes, and the bristled conveyer, detach from the goods.

Instead of cylindrical brushes, endless bristled bands resembling conveyers may be provided, and Fig. 16 shows an example. In this figure, 63 is a bristled endless band carried on rollers 63', 63' below the conveyer 44, its bristles projecting through the conveyer, and 64 is a similar band carried on rollers 64', 64' above the conveyer. The cooperation of the brushes is the same as described with reference to Fig. 13. The two brushes 63, 64 may be reciprocated in unison, or, if desired, only one of them, for instance, the upper brush 64, is reciprocated. The brushes may also be reciprocated in opposite directions as thereby flat goods are treated uniformly on their upper and lower surfaces. It has been found that the goods will continue their movement at right angles to the brushes notwithstanding their reciprocation.

An important improvement consists in that I may construct the upper part of the machine, with the brush or brushes, as an independent unit so that it can be used separately or in combination with other apparatus. In this manner, I am able to attach the independent upper part to a machine for dividing cakes, ginger bread etc. so that the cakes or the like are coated before being baked. Goods of this kind consequently consist of two baked layers of different constitution, and heretofore it was not possible to obtain this sort of goods which are very popular, by mechanical means.

Machines for goods of this kind, as gingerbread, are generally only required at certain periods of the year and it would not pay to provide a complete machine for coating gingerbread. With my independent upper part, however, the difficulty is overcome.

Referring now to Figs. 17 and 18, these show the detachable or independent upper part, in its cowl 81, applied to a dividing machine which supplies divided goods 76 to the conveyer 44. The shaft 24 of the brush 30 and the shaft of its supply cylinder 32 are carried in the end walls 81' of the cowl one of which is shown in Fig. 18. A shaft 65 having a crank 66 and a bevel gear 67 is arranged in suitable bearings in parallel to the end wall 81'. 69 is a bevel gear on a driving shaft 68 which meshes with the bevel gear 67. 70 is a pulley on the shaft 68 and 71 is a belt on the pulley. The belt 71 is actuated by a motor, not shown, or from a shaft, not shown, of the dividing machine. 72 is the pin of the crank 66, 73 is a connecting rod on the pin, 74 is a pin in an annulus 75 which is rotatably carried on the shaft 24 of the brush 30 so that the shaft is reciprocated, and 75 is a chain for imparting rotation to the roller 32 and the brush 30. The means for effecting this have already been described with reference to Figs. 1 and 2 and are not shown in Fig. 17. Motion may be imparted to the chain 75 from a shaft, not shown, of the dividing machine. The conveyer 44 forms part of the dividing machine and the goods 76 are delivered to the conveyer. 78 is a short conveyer with a roller 79 and a hopper 80. These are parts of the dividing machine and serve for receiving the waste between the divided parts of dough.

Dividing machines operate intermittently and it is necessary to adapt the operation of the brush to this, that is, the brush is applied for coating or dusting the goods while the conveyer is arrested for the dividing operation, or while it is moving, but in any case intermittently. With large cakes the brush is preferably applied while the goods are moving forwards. This can be effected by lowering the brush when the goods are starting to move, and then raising it. In this case, however, the coating is not uniform as the brushes partly run idle and coating is dripping from them. Therefore in this case brushes are preferable in which, as in Figs. 5 and 6, the bristles extend only over part of the perimeter. This not only effects uniform coating but also eliminates the necessity of raising and lowering the brush. With a brush of this kind the feeding movement of the goods and the rotation of the brush must be so timed that the parts on which bristles are secured, will actually engage the goods.

Referring now to Fig. 19 the upper part of the machine is provided with a steam supply pipe 82 in its hood 81 in order to maintain the coating substance at a high temperature. The brush 64 designed as in Fig. 16 cooperates with a bristled conveyer 44, 44', and 32 is the supply cylinder. The trunnions of the cylinder 32 are held in blocks 85 which are adapted to be displaced by a spindle 87 and a hand wheel 86.

The steam main 88 is provided with branches 89 and 90 for heating the cylinder 32 and the trough 33.

I claim:

1. A process for treating the surfaces of confectionery and the like, consisting in the steps of simultaneously passing the bristles of a rotating brush tangentially against the surface to be treated and reciprocating the bristles and surface relatively to each other in a path parallel to the axis of rotation, while maintaining the speed of reciprocation at least as high as the tangential speed, and applying a coating substance to the rotating bristles when they are out of contact with the surface to be treated.

2. A process for coating the surfaces of baked articles, confectionery, and the like, consisting in the simultaneous steps of applying the coating to both sides of the articles by the bristles of rotating brushes passing tangentially against the surface to be treated and reciprocating the bristles and surface relatively to each other in paths parallel to the axis of rotation.

In testimony whereof, I have signed my name to this specification this 20th day of December, 1927.

OTTO KREMMLING.